United States Patent [19]

Scheuerpflug et al.

[11] 4,385,469
[45] May 31, 1983

[54] LOCK STRUCTURE FOR ENTRY AND EXIT PASSAGES OF SENSITIVE INSTALLATION

[75] Inventors: Wolfgang Scheuerpflug; Erbo Monnich, both of Karlsruhe, Fed. Rep. of Germany

[73] Assignee: Kernforschungszentrum Karlsruhe G.m.b.H., Karlsruhe, Fed. Rep. of Germany

[21] Appl. No.: 257,582

[22] Filed: Apr. 27, 1981

Related U.S. Application Data

[63] Continuation-in-part of Ser. No. 51,671, Jun. 25, 1979.

[30] Foreign Application Priority Data

Jul. 13, 1978 [DE] Fed. Rep. of Germany ....... 2830737

[51] Int. Cl.³ .............................................. E06B 3/24
[52] U.S. Cl. ............................................. 49/41; 109/8
[58] Field of Search ..................... 49/41, 31, 38, 40; 109/3, 6, 8, 9

[56] References Cited

U.S. PATENT DOCUMENTS

| | | | |
|---|---|---|---|
| 1,965,030 | 7/1934 | Clark | 109/8 |
| 3,085,464 | 4/1963 | Touvay | 49/41 |
| 3,285,209 | 11/1966 | Pacel | 109/8 |
| 3,658,277 | 4/1972 | Anderson | 49/41 X |
| 3,779,178 | 12/1973 | Riseley, Jr. | 109/6 |
| 4,060,039 | 11/1977 | Lagarrique | 109/3 |
| 4,122,783 | 10/1978 | Pretini | 109/3 |

*Primary Examiner*—Kenneth Downey

[57] ABSTRACT

A lock structure is disposed in entry and exit passages of sensitive installations, especially nuclear installations, wherein a housing with a revolving gate is arranged in a wall through which said passages extend. Radiation and metal detectors are associated with the lock structure so as to detect radioactive material or weapons being carried through the lock structure. The revolving gate is lockable by latches activated by the detectors so as to lock the revolving gate and prevent passage upon detection of gamma radiation or metal objects.

9 Claims, 6 Drawing Figures

LOCK STRUCTURE FOR ENTRY AND EXIT PASSAGES OF SENSITIVE INSTALLATION

CROSS-REFERENCE TO RELATED APPLICATION

This is a continuation-in-part of application Ser. No. 51,671 filed June 25, 1979, entitled "Lock Structure For Entry And Exit Passages Of Sensitive Installation".

BACKGROUND OF THE INVENTION

1. Field of the Invention

The invention relates to a lock structure for entry and exit passages, especially of nuclear installations, which lock structure includes a lock chamber having detectors associated therewith for surveillance of the passages and locking means for closing said lock chamber to prevent passage through the lock structure depending on the surveillance.

2. Description of the Prior Art

A lock structure consisting of a chamber with two doors which can be locked depending on test data obtained from sensors surveying the lock chamber is known. Because of dynamic measuring of the content of the chamber and since the content cannot be moved straight through the chamber as one door must always be closed, there have to be back-up areas in front of and after the detectors. It is therefore possible to deposit objects in a back-up area, that is, in front of the detector sensing section to prevent them from being detected until the opposite door is opened. If skillfully handled, they may then be taken out through the opposite door. Although this action will cause an alarm, the action itself cannot be prevented.

Furthermore, the concept permits only discontinuous individual operation which makes it practically impossible to handle a good number of people within a reasonable time especially since the size of the chamber must be kept as small as possible.

In order to prevent, under any circumstances, removal of radioactive materials from, or introduction of explosives into, a nuclear installation, an airlock structure for people consists of a rotatable cylinder having at least one lock chamber formed therein. The structure has detectors associated therewith such that, upon rotation of the cylinder in order to move the lock chamber between the entry and exit of the lock structure, the chamber is moved past the detectors thereby causing complete scanning of the lock chamber. Preferably, the rotatable cylinder is received in an opening of a wall structure of sufficient circumferential extent that the scanning of the chamber is completed before the chamber reaches the exit opening and locking means are provided which automatically lock the cylinder in position when activated by the detectors. The cylinder may consist for example of a solid body with vertical axis and having at least one radial cavity forming the chamber. There may be for example two chambers formed by a spider structure—like a normal revolving door wherein, however, only two opposite segments are open and the others are closed. In one embodiment, the revolving door consists of walls extending from the floor to the ceiling, the walls consisting of non-metallic material, preferably bullet-proof glass. Gamma detectors are used for the surveillance of the lock chamber. Additionally, metal detectors may be arranged around the lock chamber, the gamma detectors may be arranged in the axis of rotation of the revolving cylinder or they may be arranged in a frame structure around the lock chamber wherein one leg of such frame coincides with the axis of the revolving cylinder and another leg of the frame is arranged adjacent the circumference of the revolving cylinder. Metal detectors may be arranged at the entry and at the exit openings such that their effective ranges extend into the revolving cylinder area. They may even be arranged in the floor and/or the ceiling of the lock structure.

The locking means for the revolving cylinder consists of a mechanism which, in the preferred arrangement, includes a ratchet structure mounted either on the circumference of the revolving cylinder or formed as a cam-disc coaxial with, and connected to, the revolving cylinder such that rotation of the revolving cylinder in one direction is permitted, while rotation in the opposite direction is prevented in a stepwise fashion by automatically engaging spring-loaded or lockable latch members. There are preferably two such cam discs with latching cams spaced 90° and effective to lock the respective discs in opposite directions of rotation with the locking surfaces of the cams and the respective latching members arranged about at the same positions. There are two latching members associated with one of the disks and spaced slightly less than 90° by an angle of $\epsilon°$, the latches consisting of a mechanically operable latch and an automatically operating spring-biased latch, the other disc having only a mechanically operable latch associated therewith, the mechanically operable latches being lockable or releasable from outside the lock structure, for example by mechanical or electrical means.

The lock structure as lined out insures reliable sealing off of the containment area to be protected for reliable supervision. The lock structure is also easily operable and does not require any auxiliary operating energy. The simple locking mechanism safely locks the doors when activated by the sensors. Unrestricted passage is never possible. Every portion of the lock chamber is scanned before passage becomes possible which insures optimum surveillance. It is practically impossible to manipulate any detectable material or device in such a manner that it can be brought through the lock structure. In addition operating capacity of the lock structure is very high.

DESCRIPTION OF THE PREFERRED EMBODIMENT

Figure 1:
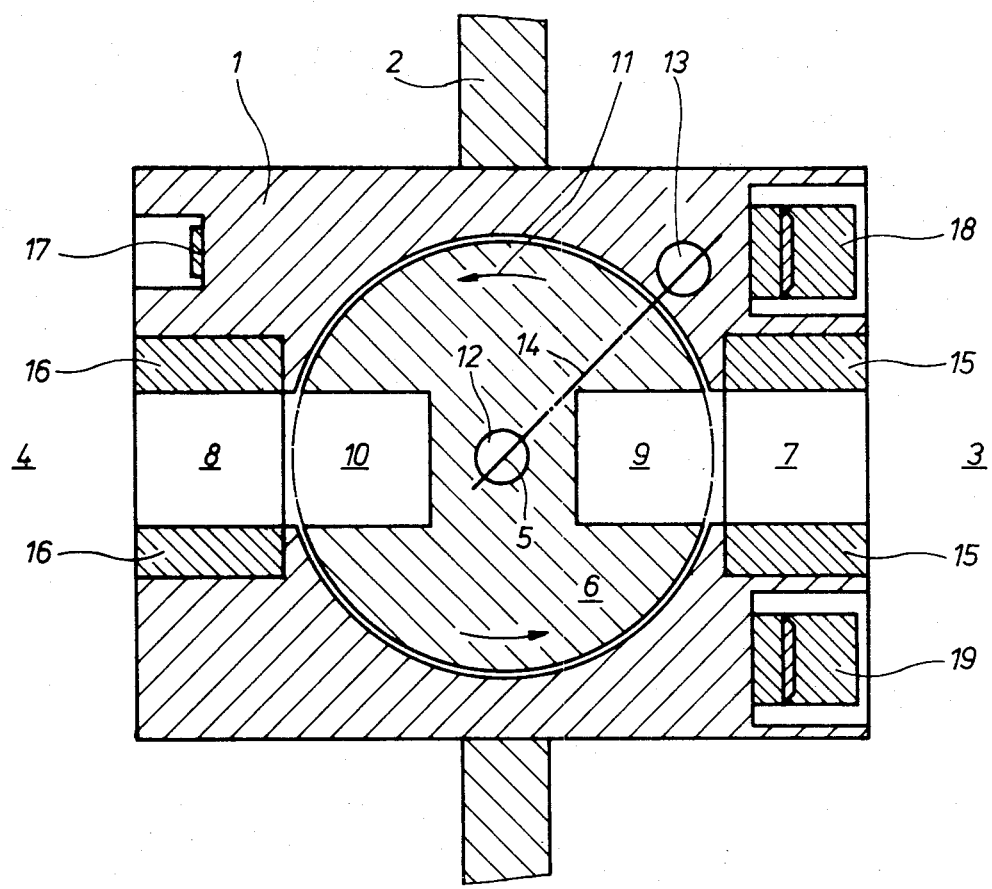
FIG. 1 is a horizontal cross-sectional view of the lock structure of the present invention.

As shown in FIG. 1, the lock structure consists of a housing 1 mounted in a wall 2 surrounding an installation to be protected, which wall separates an inner area 3 which is under surveillance from an outer area 4. The housing 1 contains a revolving gate structure 6 which is rotatable about its vertical axis 5. Together with the housing 1 and with an entry 7 and an exit 8 the revolving gate structure 6 forms a revolving "air lock". The revolving gate structure is impossible, the revolving gate structure extending from floor 30 to ceiling 31 (FIG. 5) of the passageway 7–8.

Figure 6:
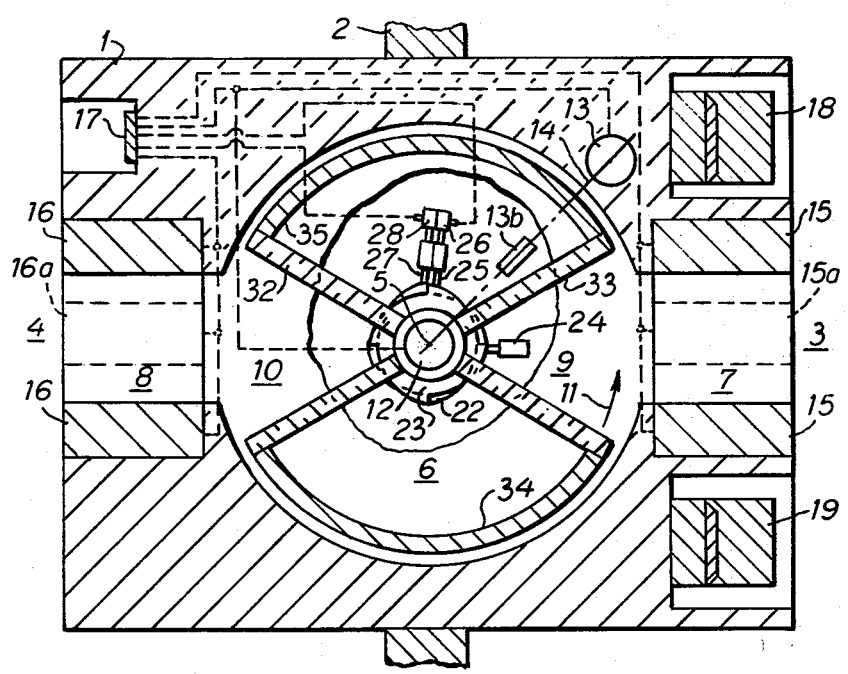
FIG. 6 is a cross-sectional top view of a lock structure according to one embodiment of the invention.

The revolving gate structure in the embodiment shown in FIG. 1 consists of a cylindrical body 6 with vertical axis. It has one or a plurality of lock chambers 9 and 10 which, by rotation of the body 6 in the direction of arrows 11 about its axis 7, may be brought in communication with the entry 7 or the exit 8 so that the lock chambers 9 and 10 are accessible therefrom. The revolving gate structure may also consist of a revolving door with two intersecting vertical walls 32, 33 forming four chambers of which two opposite chambers are used as the lock chambers whereas the other chambers formed by the walls are closed by circumferential walls 34, 35 (FIG. 6). The walls of such a revolving door 6 consist of a transparent but solid material, preferably of bullet-proof glass or a similar material such that visual survey of the lock chambers 9 and 10 is possible. The lock structure has a $\gamma$-radiation detecting system 12, 13 associated therewith in the form of a gate monitor. One part 12 of the detecting system is arranged in the axis of rotation of the revolving door structure 6 whereas the other part 13 is arranged in the housing 1 displaced from the transfer passage direction by about 45° in the direction of rotation of the revolving door 6. Preferably, $\gamma$-radiation detectors are arranged frame-like around the path of travel of the lock chambers with the one section (12) of the frame coinciding with the axis 5 of rotation of the revolving body 6 and an other section (12) being disposed in the housing 1. Detectors 13$a$ and 13$b$ may be disposed in the ceiling 31 and the floor 30 respectively, all in the same plane 14. Therefore, $\gamma$ activity is surveyed in a plane 14 in which all sensors of the detecting system are disposed; and since both lock chambers 9 and 10 have to move through the plane 14 when the revolving door 6 is rotated the chambers 9 and 10 are fully scanned before passage is possible.

The housing 1 is further provided with metal detectors 15 and 16 so arranged in the side walls of the entrance 7 and of the exit 8 respectively, that access to the lock chambers 9 and 10 is only through the effective sensing range of the metal detectors 15 and 16. Preferably, metal detectors 15$a,b$, 16$a,b$ are arranged also in the floor and ceiling around the entry as well as the exit passages 7 and 8 such that people moving through the passages are automatically surveyed for metallic objects. The result of the survey is stored in the electronic control device 17. In addition, there are provided at the entry 7, that is at the inner end of the lock structure, conventional $\alpha$ and $\beta$-radiation sensors 18 and 19 which do not affect the locking mechanism of the lock structure. They are required as contamination survey devices of the exits of all nuclear installation. Further, there may be provided in the chambers 9 and 10 admission control systems such as key card readers, which systems however are not shown in detail as they are known.

Figure 2:
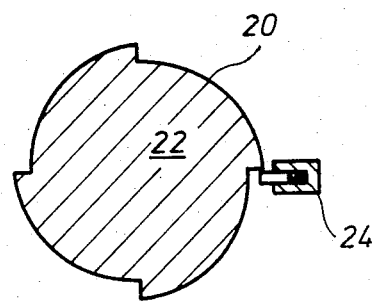
FIGS. 2 to 4 show the latching and locking mechanisms.
Figure 3:
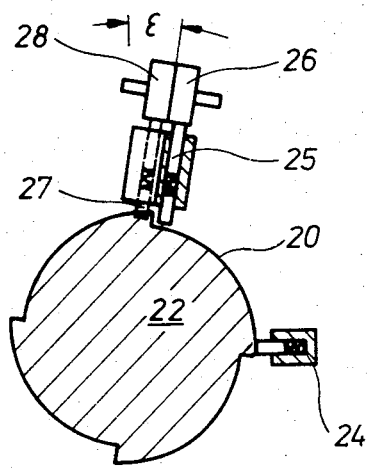
Figure 4:
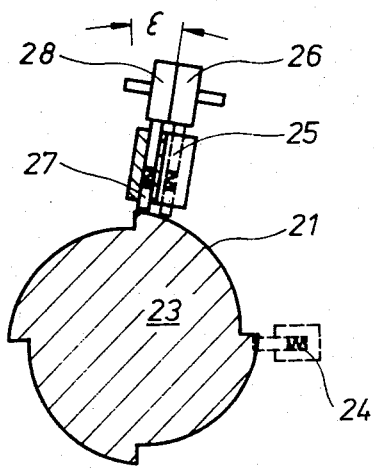
Figure 5:
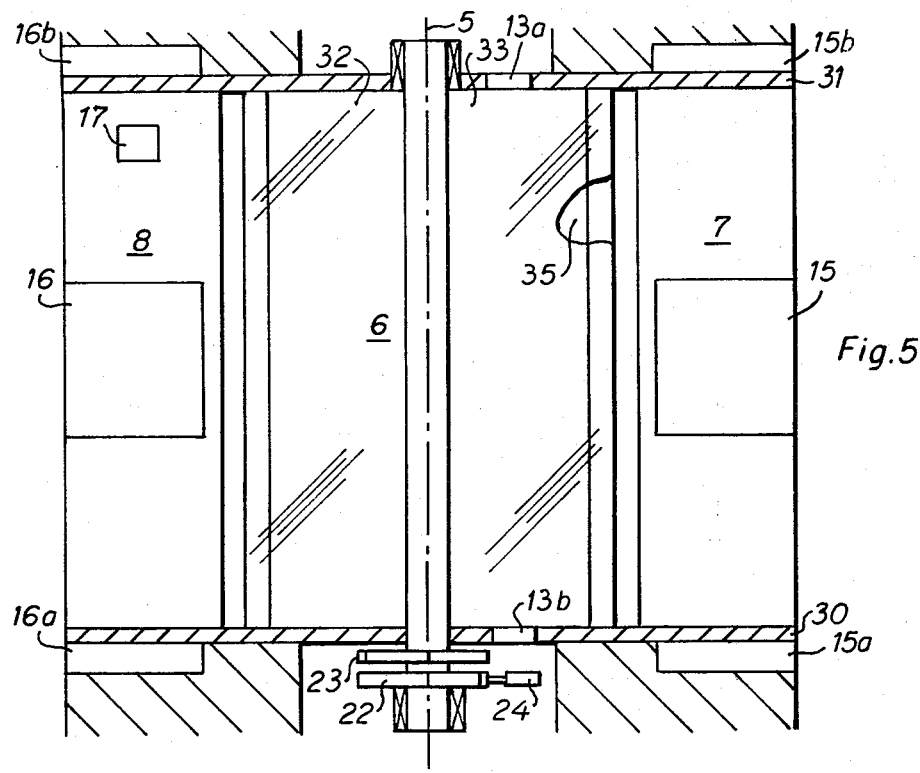
FIG. 5 is a cross-sectional side view.

Locking of the lock structure or rather of the revolving body 6 in the housing 1 is achieved by means of the locking or latching mechanism shown in FIGS. 2 to 4. The revolving body 6 has cam discs 22, 23 associated for rotation therewith, which cam discs have camming surfaces 20, 21 provided with steps at 90° intervals. The cam surfaces 20, 21 may also be formed directly on the outer circumference of the revolving body 6. As shown in FIG. 5 the cam discs 22, 23 are mounted on the revolving door shaft below the floor 30 of the lock structure together with latch mechanisms 24–28, the cam discs and latch mechanisms being shown in detail in FIGS. 2, 3 and 4 to explain their operation. The cam discs 22 and 23, of which one (22) is shown in FIGS. 2 and 3 and the other (23) is shown in FIG. 4, are ratchet-like shaped and arranged in opposite directions, such that the revolving body may be locked in either direction of rotation. The cam disc 22 permits rotation of the revolving body in the main direction of rotation and prevents reverse rotation after a 90° turn by means of a spring loaded latch 24 which automatically engages the disc 22.

Another lockable or operable latch 25 is also engageable with the cam disc 22; it can be caused to engage or disengage the disc mechanically or electromagnetically under the control of the detectors 12, 13, 15 or 16. This latch is displaced from the first latch in the direction of rotation of the revolving body by an angle which is slightly less than 90° by a small angle $\epsilon$.

Next to the operable latch 25, there is another latch 27 with a similar operating mechanism 28 so arranged that it cooperates with the cam surface 21 of the cam disc 23. This other latch 27, too, is displaced from the first latch in the direction of rotation of the revolving body by an angle which is less than 90° by a small angle $\epsilon$ and it can prevent rotation of the revolving body as the cam surface 21 of the cam disc 23 is arranged in the direction opposite to that of the other cam disc 22 depending on the signals supplied by the detectors 12, 13, 15, 16 to the control device 17. As shown schematically in FIG. 6 by dashed lines, all the sensors 12, 13, 15, 16 are connected to the control device 17 which has connections to the operable latches 26 and 28 and is capable of operating the latches 26 and 28.

Operation of the lock Structure

In order to pass through the lock structure from one side 7 to the other side 8 the revolving body 6 is moved in the direction of arrow 11 either by a person entering the lock chamber 9 or by a suitable drive means. Rotation of the revolving body 6 out of its normal position as shown in FIG. 1 in a direction opposite to that indicated by arrow 11 is prevented by the spring loaded latch 24 shown in FIG. 2, which latch 24 cooperates with the cam disc 22 which is mounted for rotation with the revolving body 6. During passage through the lock structure, that is when a person is moving from area 3 to area 4, the person first has to pass through the metal detectors 15 and then through the sensing plate 14 of the gamma detectors 12, 13. If none of the detectors is activated the person is permitted to enter exit area 8.

If however, one of the detectors is activated, the latch 25 is caused to engage the cam disc 22 and latch 27, cam disc 23 (FIG. 4). The person activating the detectors is then locked into one of the chambers of the revolving body 6 while an alarm is given. Since the latches 25 and 27 are displaced from the 90° position by the small angle $\epsilon$, the spring loaded latch 24 has not yet engaged the cam disc 22 in such locking position of the revolving body 6. A guard may now disengage the latch 25 by operating mechanism 26 so that the locked-in person can return the revolving body to its initial position in order to repeat the procedure. If latch 27 is disengaged by operating mechanism 28, the locked-in person is permitted to pass.

The procedure is similar for passage from area 4 to area 3. No gamma radiation detection is necessary in that case. Instead sensing for explosives may take place by detectors 16, 16$a$, 16$b$ shown in FIGS. 5 and 6 of the drawings. It is possible that one person passes through the lock structure from area 3 to area 4 while another person passes through the lock structure in opposite direction from area 4 to area 3. Means can be provided for identifying the chamber or rather the person by which an alarm was caused under these circumstances. The lock chambers 9 and 10 should be sized to accept only one person. Then it is practically impossible for a person when causing an alarm to take another person hostage.

It is further possible to provide additional gates in the entry and exit passage with latch structures which also are operatively connected to the gamma radiation and metal detectors to be locked thereby when desired.

What is claimed is:

1. A lock structure for passages between an outer and an inner protected area of sensitive installations enclosing radioactive materials, especially nuclear installations, said lock structure comprising a cylindrical housing arranged in said passage, a revolving body rotatably supported in said cylindrical housing about a vertical axis and having at least one lock chamber which is open at its radial outer end such that, in one angular position of said body, said chamber is in communication with said outer and, in the other angular position, with said inner, protected area; metal detectors so mounted in the walls of at least the outer area of said passage as to be capable of sensing movement of metal parts through said passage from said outer to said inner area; radiation detectors arranged in the center of said revolving body and the walls of the cylindrical housing adjacent the path of the revolving body between said inner protected and said outer area so as to define a survey plane in the path of movement of said chamber from said inner protected to said outer area; and locking means operatively associated with said lock structure and operable by signals from said detectors for locking said revolving body in predetermined angular positions.

2. A lock structure as recited in claim 1, wherein said revolving body is a solid cylinder having radial cavities forming said lock chambers.

3. A lock structure as recited in claim 1, wherein said revolving body is in the form of a revolving door having two intersecting vertical walls of which two opposite segments form said lock chamber and the other segments are closed.

4. A lock structure as recited in claim 3, wherein said walls consist of bullet-proof glass.

5. A lock structure as recited in claim 1, wherein said revolving body extends from the floor to the ceiling of said passage.

6. A lock structure as recited in claim 1, wherein $\gamma$-radiation detectors are arranged frame-like around the path of travel of said lock chamber with one section of said frame coinciding with the axis of rotation of said revolving body and another section being disposed in said housing adjacent said revolving body.

7. A lock structure as recited in claim 1, wherein metal detectors are arranged in the floor and in the ceiling of said passage.

8. A lock structure as recited in claim 1, wherein said locking means for locking said revolving body are mechanical latching mechanisms consisting of first and second cam discs mounted for rotation with said revolving body, each cam disc having ratchet type cams but oriented in opposite directions, one of said cam discs having a spring loaded latching mechanism associated therewith engaging said one cam disc to limit rotation of said revolving body in one direction and the other having an operable latch mechanism arranged adjacent its camming surface to prevent rotation of said revolving body in said one direction when said operable latch mechanism is activated.

9. A lock structure as recited in claim 8, wherein an operable latch mechanism is also arranged adjacent the camming surface of said one cam disc, both said operable latch mechanisms being angularly displaced from the angular position at which the ratchet latch mechanism engages said one disc in the direction of rotation of said revolving body by an angle of slightly less than 90°, said cams having four ratchet steps angularly spaced at 90°.

* * * * *